(12) United States Patent
Batruni et al.

(10) Patent No.: US 6,215,785 B1
(45) Date of Patent: Apr. 10, 2001

(54) METHOD AND APPARATUS FOR COMMUNICATING ACROSS ADSL LINES

(75) Inventors: Roy G. Batruni, Fremont; Vinod K. Bhardwaj, San Jose, both of CA (US)

(73) Assignee: ControlNet, Inc., Campbell, CA (US)

( * ) Notice: Subject to any disclaimer, the term of this patent is extended or adjusted under 35 U.S.C. 154(b) by 0 days.

(21) Appl. No.: 09/022,171

(22) Filed: Feb. 11, 1998

(51) Int. Cl.[7] .................................................. H04J 3/02
(52) U.S. Cl. ........................ 370/360; 370/338; 370/401; 370/420
(58) Field of Search .................................. 370/338, 385, 370/360, 445, 468, 522, 905, 906, 907, 400, 401, 402, 404, 420, 216, 222, 223, 224

(56) References Cited

U.S. PATENT DOCUMENTS

| | | | | |
|---|---|---|---|---|
| 5,355,362 | * | 10/1994 | Gorshe et al. ....................... | 370/222 |
| 5,668,860 | * | 9/1997 | Andruska et al. .................... | 370/385 |
| 5,844,896 | * | 12/1998 | Marks et al. ......................... | 370/385 |
| 5,864,415 | * | 1/1999 | Williams et al. ..................... | 370/907 |
| 5,881,059 | * | 3/1999 | Deschaine et al. .................. | 370/338 |
| 5,896,443 | * | 4/1999 | Dichter ................................ | 370/445 |
| 5,991,310 | * | 11/1999 | Katko .................................. | 370/522 |

* cited by examiner

*Primary Examiner*—Douglas W. Olms
*Assistant Examiner*—Shick Hom
(74) *Attorney, Agent, or Firm*—Beyer Weaver & Thomas LLP (57) ABSTRACT

Methods and apparatus for efficiently communicating across an asymmetric digital subscriber loop are disclosed. According to one aspect of the present invention, a method for communicating between a computer in a central office and a remote computer across DSL communications links involves sending a first set of data from the central office computer across a first DSL communications link. The first DSL communications link couples the central office computer to a switch. The method also includes selecting a second DSL communications link, which couples the switch and the remote computer, and sending the first set of data from the switch to the remote computer across the second DSL communications link.

6 Claims, 7 Drawing Sheets

METHOD AND APPARATUS FOR COMMUNICATING ACROSS ADSL LINES

BACKGROUND OF THE INVENTION

1. Field of Invention

The present invention relates generally to methods and apparatus for communicating across a computer network. More particularly, the present invention relates to methods and apparatus for efficiently communicating across a digital subscriber loop (DSL).

2. Description of the Relevant Art

As computer usage becomes increasingly prevalent, the ability to share resources between computers has also increased. Computer systems at many different locations are often linked by a network such that information may be shared between the computer systems, e.g., data may be transferred between the computer systems.

Many different protocols may be used to transfer data between computer systems. By way of example, some protocols include an integrated services digital network (ISDN) and a digital subscriber loop (DSL), which are well known to those skilled in the art. Recently, due to the popularity of the Internet, as the volume of data which is transferred between computer systems increases, the demand for the ability to transfer large volumes of information in relatively short periods of time is growing. Accordingly, DSL technology is constantly being improved to address growing demands.

Figure 1:
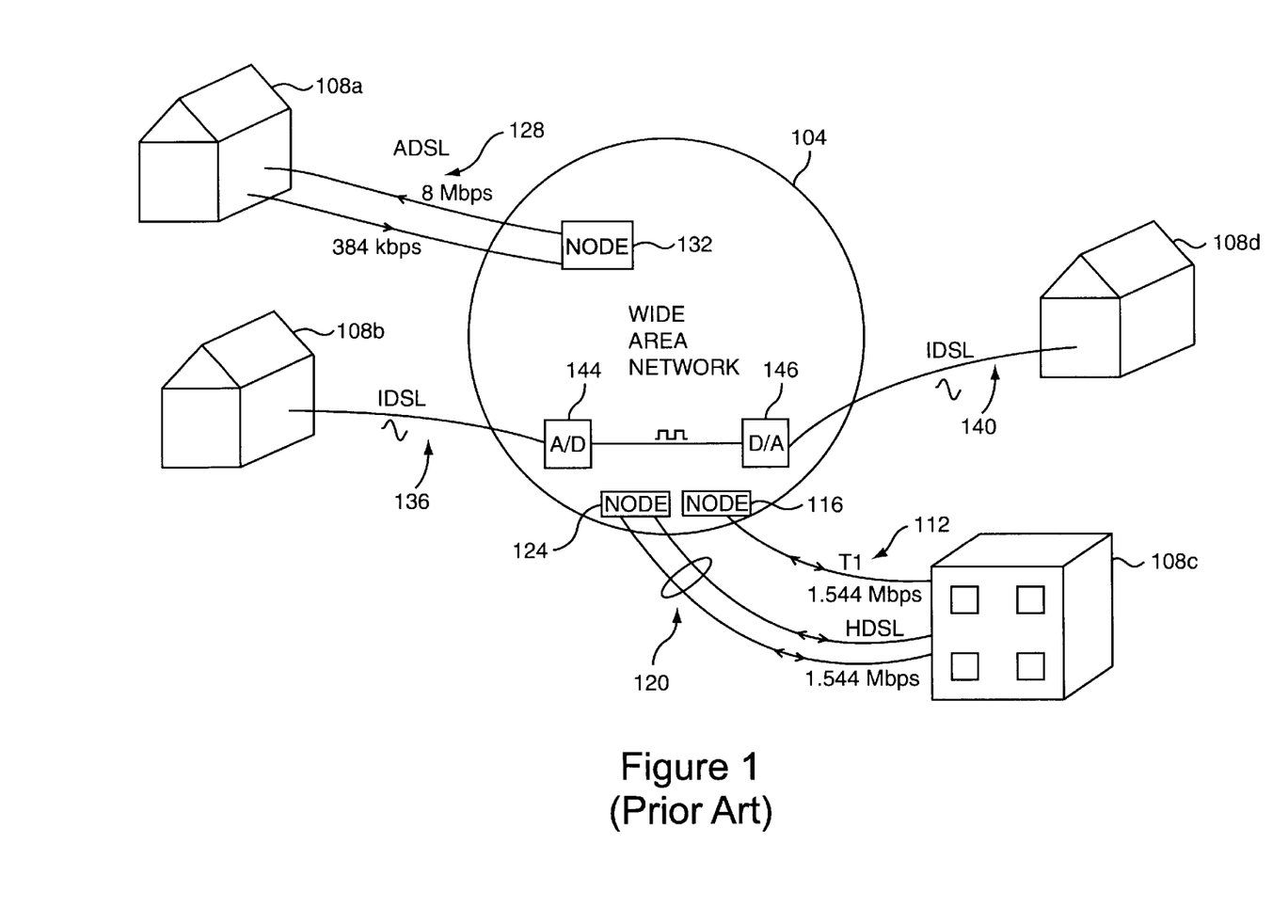
FIG. 1 is a diagrammatic representation of different subscriber loops interfacing with a wide area network in accordance with prior art.

Subscriber loops, as for example DSLs, are commonly used to enable computers to communicate over a network. FIG. 1 is a diagrammatic representation of different subscriber loops in communication with a wide area network (WAN) in accordance with prior art. WAN 104 is essentially the network over which various entities 108a–d are allowed to communicate in order to transfer data. Entities 108a–d may generally include small customers, which are often "residences," e.g., residence customer 108a, that have computer systems and/or entertainment systems that are linked to WAN 104. Entities 108a–d may also include large customers or "businesses," e.g., business customer 108c, which have computer systems that are in communication with WAN 104.

Business customer 108c may often require bi-directional high speed data transfer. By way of example, business customer 108c may need to readily access and update databases located in WAN 104. As such, business customer 108c is typically linked to WAN 104 using data lines which are capable of supporting bi-directional high speed data transfer. A T1 line 112 may be used to link business customer 108c to a node 116 within WAN 104. T1 line 112 has a data transfer rate of up to approximately 1.544 megabits-per-second (Mbps), and uses a single wire to bi-directionally transfer data.

As shown, a high speed DSL (HDSL) line 120 may be used to link business customer 108c to a node 124 within WAN 104. HDSL line 120, like T1 line 112, has a data transfer rate of up to approximately 1.544 Mbps. However, for reliability purposes, HDSL line 120 includes two bi-directional lines which transfer data between node 124 and business customer 108c.

Another type of communications link, an integrated DSL (IDSL), is created when ISDN technologies are applied to DSL. An IDSL line is capable of bi-directionally transferring data at rates of up to approximately 128 Kbps, which is typically sufficient for transmitting voice information between touch-tone (TT) phones. A first IDSL line 136 may be used to connect a TT phone associated with an entity, e.g., residence customer 108b, across WAN 104, to a TT phone associated with another entity, e.g., residence customer 108d, which is connected to a second IDSL line 140. When voice data is to be transmitted from residence customer 108b to residence customer 108d, the voice data is transmitted in analog form across IDSL line 136, which is a copper wire, to a node 144 where the voice data is digitized. The digitized voice data is then routed over WAN to another node 146, where the digitized voice data is converted back into analog form, and sent over IDSL line 140 to residence customer 108d.

Residence customer 108a, unlike business customer 108c, may not require bi-directional high speed data transfer, due to that fact that residence customer 108a is typically more likely to download information, e.g., video data for video-on-demand technologies, through WAN 104 than to upload information through WAN 104. Accordingly, residence customer 108a generally uses an asymmetric DSL (ADSL) connection 128 which includes a "downloading" line that is arranged transfer data downloaded from a node 132, or a central office port, to residence customer 108a at rates of up to approximately 8 Mbps. ADSL connection 128 also includes an "uploading" line which is arranged to transfer data uploaded from residence customer 108a to node 132 at rates of up to approximately 384 kilobytes-per-second (Kbps).

In general, an IDSL connection is considered to be sufficient to transfer voice data between TT phones because the volume of data transfer is relatively low. However, in order to transfer data relating to the Internet, e.g., World Wide Web pages and video-on-demand data, to Internet customers such as residence customers, an ADSL connection is typically preferred over an IDSL connection. Internet usage typically involves downloading information to a computer system, as for example a computer system associated with the residence customer. Hence, since an ADSL connection is arranged to provide the capability to quickly download relatively high volumes of data to a computer system, while still enabling data to be uploaded from the computer system when necessary, an ADSL connection is particularly suitable for use by customers who generally download data.

Figure 2:
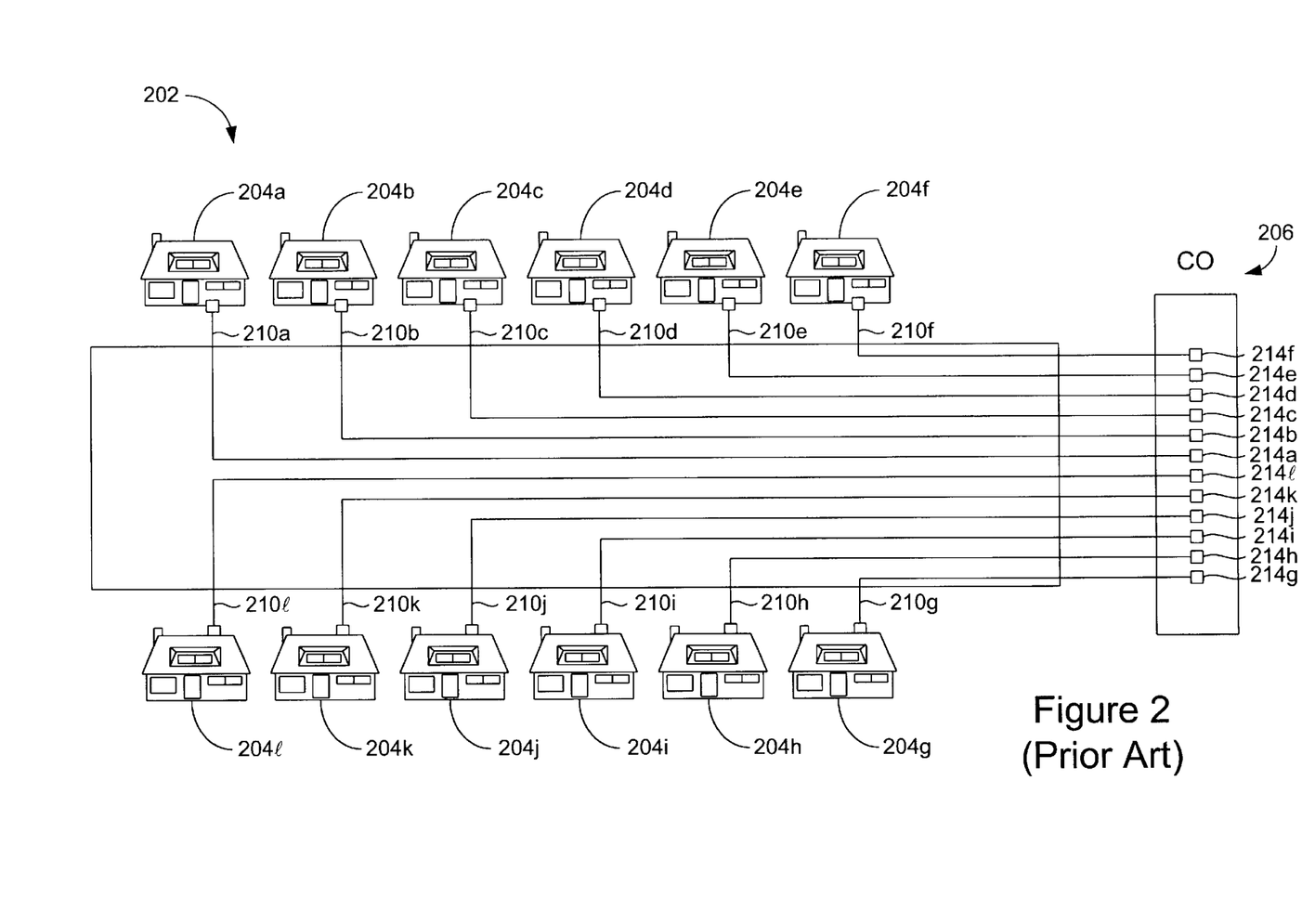
FIG. 2 is a diagrammatic representation of point-to-point ADSL connections to a central office in accordance with prior art.

Although an ADSL connection is effective for use in transferring data over the Internet, an ADSL connection typically requires a dedicated node, e.g., a dedicated central office port with an ADSL card, as well as dedicated power for each Internet customer. FIG. 2 is a diagrammatic representation of conventional point-to-point ADSL connections to a central office (CO). As shown, a system with point-to-point ADSL connections 202 includes customers 204a–l, e.g., residences, which are each linked to a central office 206 via ADSL connections 210a–l. Specifically, customers 204a–l are linked via ADSL connections 210a–l to dedicated ports 214a–l associated with central office 206.

Each customer 204a–l generally has a point-to-point ADSL card which is connected to an appropriate ADSL connection 210a–l. The appropriate ADSL connection 210a–l is connected to a point-to-point ADSL card at central office 206 (not shown) which is associated with an appropriate port 214a–l. ADSL cards include point-to-point ADSL cards, such as those which are available commercially from Interphase Corporation of Dallas, Texas.

An ADSL connection, as for example ADSL connection 210a is generally comprised of a copper twisted pair over which data is transmitted downstream to customer 204a, and upstream from customer 204a to central office 206. Due to the fact that availability of copper wire is relatively fixed in the current communications network infrastructure, and, further, that separate ports, such as port 214a, are required for each customer 204a–l, the implementation of point-to-point ADSL is often expensive.

Since data transferred over the Internet is bursty data, as will be appreciated by those skilled in the art, ADSL connections, e.g., ADSL connections 210a–l, are not active, or in use, much of the time. Therefore, as the full bandwidth associated with the ADSL connections is largely unused, resources associated with the ADSL connections are often essentially wasted. Further, as the length of an ADSL connection increases, the effective data transfer rate decreases. In other words, as the distances between a central office and an Internet customer increases, the data transfer rate across an ADSL connection between the central office and the customer decreases. As a result, while ADSL connections may transfer data at rates of between approximately 6 Mbps to approximately 8 Mbps, due to noise and attenuation which increase as the distance from a central office increases, many ADSL connections transfer data at substantially lower rates, as for example at approximately 384 Kbps. For example, with reference to FIG. 2, the maximum data transfer rate associated with ADSL connection 210f, which is relatively close to central office 206, may be approximately 6 Mbps to approximately 8 Mbps, while the maximum data transfer rate associated with ADSL connection 210a, which is relatively far removed from central office 206, may be approximately 384 Kbps.

Since the costs associated with an ADSL connection are generally high, as mentioned above, when an ADSL connection is only able to download data at rates of up to approximately 384 Kbps due to the length of the ADSL connection, the use of the ADSL connection may be considered to be inefficient. In addition, allowing an ADSL connection to a central office to remain idle while awaiting the transmission of data characterized as bursty data is an inefficient use of ADSL technology, as well as central office, resources.

Therefore, what is desired is an efficient method for utilizing DSL connections and central office resources, while maintaining an acceptable data transfer rate over the DSL connections, especially ADSL connections.

SUMMARY OF THE INVENTION

Methods and apparatus for efficiently communicating across a digital subscriber loop are disclosed. According to one aspect of the present invention, a method for communicating between a computer in a central office and a remote computer across DSL communications links includes sending a first set of data from the central office computer across a first DSL communications link. The first DSL communications link couples the central office computer to a switching mechanism. The method also includes selecting a second DSL communications link, which couples the switching mechanism and the remote computer, and sending the first set of data from the switching mechanism to the remote computer across the second DSL communications link. In preferred embodiments, the DSL communications links may be ADSL communications links.

In one embodiment, the method further includes sending a second set of data from the remote computer across the second DSL communications link to the switching mechanism, and sending the second set of data from the switching mechanism to the central office computer across the first DSL communications link. In such an embodiment, the method may include determining the availability of the first DSL communications link prior to sending the second set of data across the first DSL communications link, and delaying sending the second set of data from the switching mechanism to the central office across the first DSL communications link when it is decided that the first DSL communications link is not available.

According to another aspect of the present invention, an apparatus for enabling a remote computer to exchange data bi-directionally with a central office across DSL communications links includes a central office port which is associated with the central office, as well as a switching assembly which is coupled to the central office port through a first DSL communications link. The apparatus also includes a plurality of distribution links. At least one of the distribution links couples the switching assembly with the remote computer in order to facilitate the exchange of data between the central office and the remote computer through the switching assembly. In one embodiment, the central office port is associated with a first DSL card, the switching assembly is associated with a second DSL card, and the remote computer is associated with a third DSL card. In another embodiment, the first DSL communications link includes a first uploading cable for uploading the data to the central office and a first downloading cable for downloading the data to the remote computer. In such an embodiment, the selected distribution link includes a second uploading cable for uploading the data to the central office and a second downloading cable for downloading the data to the remote computer.

In accordance with still another aspect of the present invention, a method for transferring data from a first end point to a second end point includes transferring the data from the first end point over a first DSL communications link to a switching mechanism. A connection between the first DSL communications link and a second DSL communications link is effected using the switching mechanism, and data is transferred over a second DSL communications link to the second end point. In one embodiment, the data is transferred over the first DSL communications link at a data transfer rate of up to approximately 8 Mbps. In such an embodiment, the data transfer rate over the first DSL communications link may be in the range of approximately 384 kbps to approximately 8 Mbps.

BRIEF DESCRIPTION OF THE DRAWINGS

The invention may best be understood by reference to the following description taken in conjunction with the accompanying drawings in which.

DETAILED DESCRIPTION OF THE EMBODIMENTS

In the description that follows, preferred embodiments of the invention that utilize ADSL connections will be described. The invention, however, is not limited to any one connection or hardware configuration. Accordingly, the description that follows is for illustration and not limitation.

Much of the data transferred over the Internet may be characterized as bursty data. Hence, ADSL connections between Internet customers and a central office are idle much of the time. Allowing ADSL connections, as well as central office ports, to remain idle may be considered to be an inefficient use of resources, since ADSL connections and dedicated central office ports are expensive to implement and maintain. In addition, the length of an ADSL connection affects the data transfer rate also decrease. As a result, data transferred across ADSL connections are often transferred at rates which are substantially lower than the maximum data transfer rates which are typically attributed to ADSL connections.

In order to increase the efficiency of ADSL connections, as well as to increase the available data transfer rates associated with ADSL connections which may be located relatively far from a central office, a "switched" ADSL architecture may be implemented. Implementing a switched ADSL architecture may entail the use of a switching mechanism which multiplexes a plurality of customers, or computers, to a single ADSL connection that is associated with a central office port. By multiplexing a plurality of customers to a single central office port, the customer base associated with a particular central office may be increased, thereby increasing the efficiency of the central office. Multiplexing customers through a switching mechanism enables a single ADSL connection to service a plurality of customers, thereby increasing the utilization of the available bandwidth of the ADSL connection. The use of a switching mechanism in conjunction with a shared ADSL connection also reduces the effect of the physical distance between a specific customer and a central office on the data transmission rate between the customer and the central office.

Figure 3:
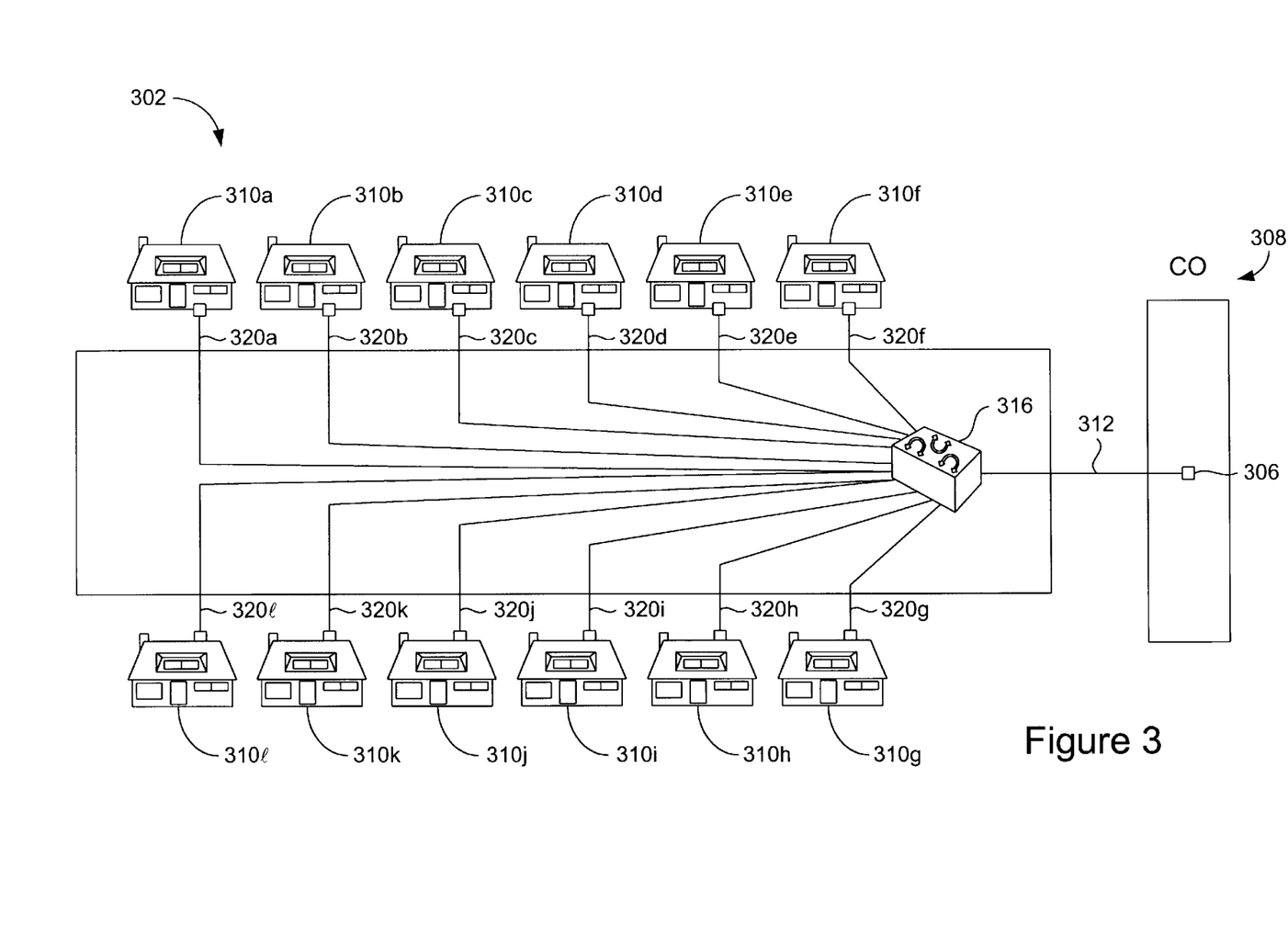
FIG. 3 is a diagrammatic representation of "switched" ADSL connections to a central office in accordance with a first embodiment of the present invention.

With reference to FIG. 3, switched ADSL connections to a central office will be described in accordance with a first embodiment of the present invention. Using a system of switched ADSL connections 302, a single port 306 in a central office 308 may serve aplurality of customers 310a–l. Customers 310a–l are generally computer service subscribers, or entities with computer systems which are in communication with a wide area network (WAN) via central office 308. In one embodiment, customers 310a–l are Internet customers with central processing units (CPUs) which are linked to the Internet.

A shared ADSL connection 312, or a feeder cable, is coupled to single port 306 and an ADSL switch 316. Distribution cables 320a–l, or individual ADSL connections, which are linked to customers 310a–l, are used to enable data to be transferred, or otherwise exchanged, between customers 310a–l and ADSL switch 316. Each distribution cable 320a–l, together with shared ADSL connection 312, forms a subscriber loop or, more specifically, an ADSL. It should be appreciated that although each distribution cable 320a–l has been represented by a single line, each distribution cable 320a–l is generally a twisted pair of wires, e.g., a twisted pair of copper wires.

As shown, the use of shared ADSL connection 310 enables single port 306 to serve twelve customers 310a–l, thereby providing for easier management of central office 308. The wiring, e.g., copper wiring, and the bandwidth associated with shared ADSL connection 310 are more efficiently used when shared ADSL connection 310 is used by multiple customers, since a common length of wire is shared, and the idle time of shared ADSL connection 310 is reduced. Further, the space requirements associated with central office 308 are reduced, as rather than providing a separate port and power for each customer connected to central office 308, multiple customers may be serviced with each port.

The number of customers, e.g., customers 320a–l, which may be serviced by a single port 306 typically varies as a function of the desired information downloading rate. As such, the number of customers serviced by single port 306 may generally be widely varied. By way of example, in the described embodiment, if it is desired for customers to download information at a data transfer rate of approximately 6 Mbps, then single port 306 and ADSL switch 316 may support up to approximately twelve customers. Alternatively, if information downloaded at a data transfer rate of approximately 1.544 Mbps is acceptable, then single port 306 and ADSL switch 316 may support up to approximately fifty customers.

In general, it should be appreciated that the data transmission rate between central office 308 and ADSL switch 316 is also a function of the length of shared ADSL connection 312. It has been observed that splitting the length of an ADSL by placing a switch in the loop enables data to be transmitted at a relatively high data rate, e.g., approximately 6 Mbps to approximately 8 Mbps, on both ends of the split loop, whereas if the length of the ADSL is not split, the data transmission rate will generally be lower. Therefore, when loops are split, the relative lengths of distribution cables 320a–l have less of an effect on the rate of data transfer to customers 310a–l.

ADSL switch 316 is arranged to route data between central office 308 and customers 310a–l, and is essentially a multiplexing mechanism. When data is to be transferred from central office 308 to a specific customer, e.g., customer 310a, when both shared ADSL connection 312 and distribution cable 320a are free, the data is then routed across shared ADSL connection 312, through ADSL switch 316, and across distribution cable 320a to customer 310a. In one embodiment, ADSL switch 316 may be arranged to determine the availability of distribution cables 320a–l, wait for the appropriate distribution cable to become available, then transfer data across the free distribution cable. The routing of data between central office 308 and customers 300a–l will be described in more detail below with respect to FIG. 5.

In one embodiment, ADSL switch 316 may include buffers including a buffer that is arranged to hold data transferred across shared ADSL connection 312. Such a buffer may hold the data until the appropriate distribution cable, as for example distribution cable 320b, is available for data transfer. When distribution cable 320b is available, then data held in the buffer may be transferred over distribution cable 320b. In other words, if a customer such as customer 310a sends data to central office 308 over distribution cable 320a, but shared ADSL connection 312 is unavailable, then the buffer may store the data.

In general, components used in ADSL switch 316 may be widely varied. ADSL switch 316, in one embodiment, may include switch components, or cards, such as those available commercially from I³ of San Jose, Calif. ADSL switch 316 may further include ADSL cards, such as those which are often used for conventional point-to-point ADSL architectures. Each distribution cable 320a–l may be associated with an ADSL card within ADSL switch 316. Suitable ADSL cards include, but are not limited to, ADSL cards which are available commercially from Interphase of Dallas, Tex. Typically, an ADSL card, or unit, is also included at port 306, and at each customer 310a–l. In one embodiment, ADSL switch 316 may include a switch component and an ADSL card on a single motherboard.

Figure 4:
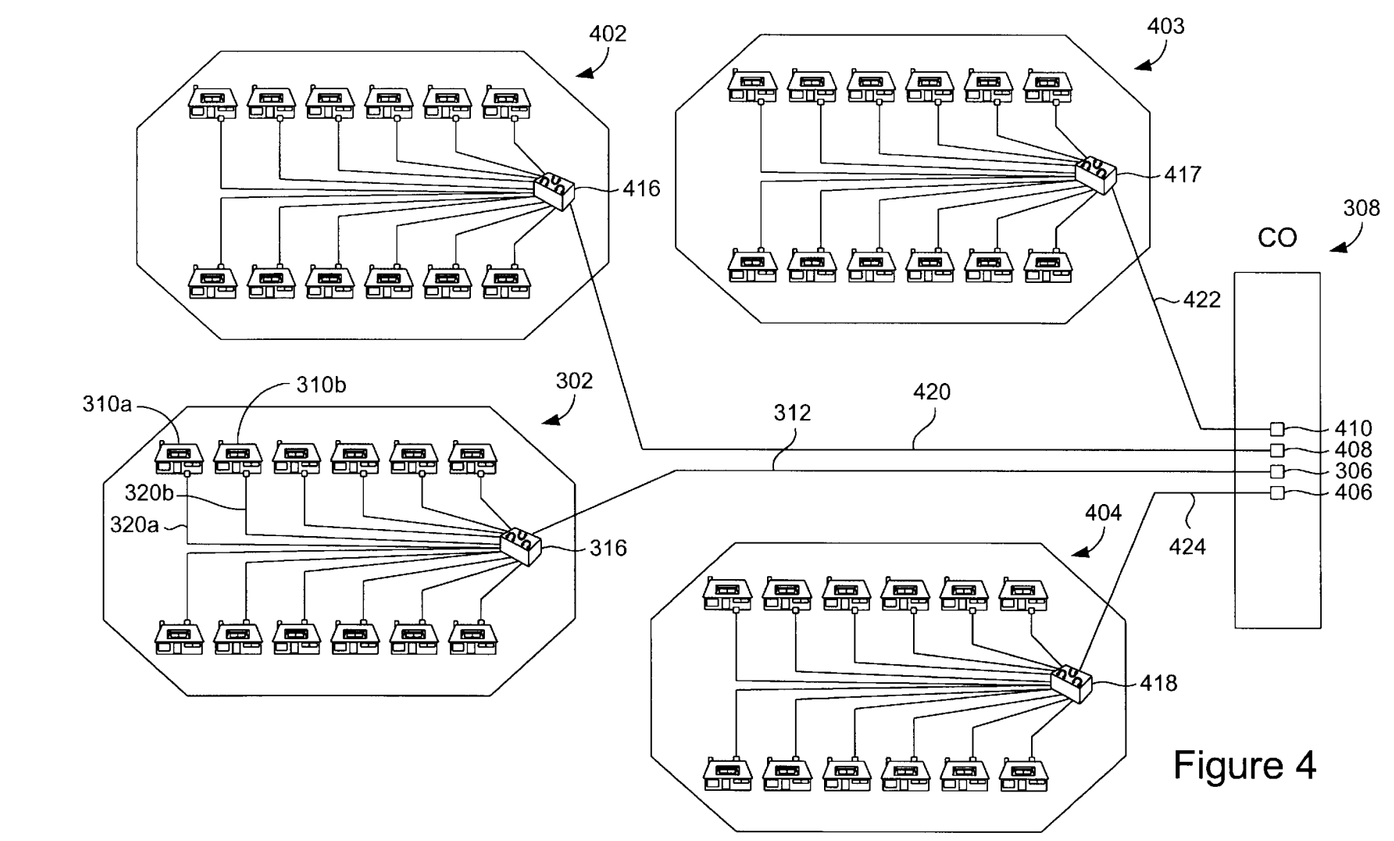
FIG. 4 is a diagrammatic representation of a plurality of switched ADSL connections to a central office in accordance with the first embodiment of the present invention.

In general, central office 308 may include any number of systems of switched ADSL connections 302. FIG. 4 is a diagrammatic representation of a plurality of systems of switched ADSL connections to central office 308 in accordance with the first embodiment of the present invention. Each system 302, 402, 403, 404 includes an ADSL switch 316, 416, 417, 418, respectively. ADSL switches 316, 416, 417, 418, in turn, are each coupled to a separate port 306, 406, 408, 410 through a shared ADSL connection 312, 420, 422, 424, respectively.

As shown, each port 306, 406, 408, 410 in central office 308 may support multiple customers, e.g., twelve customers. Therefore, the capacity of customers which may be served by central office 308 may be increased by providing each port 306, 406, 408, 410 with the capability to support more than one customer. Further, in addition to reducing the number of ports necessary to support a given customer base, the volume of wire which is needed to support the customer base is reduced through the use of shared ADSL connections 312, 420, 422, 424. In general, the number of ports and, also, the number of switches linked to central office 308 is dependent on a variety of different factors, including, but not limited to, the performance and quality levels which are considered to be acceptable.

Figure 5:
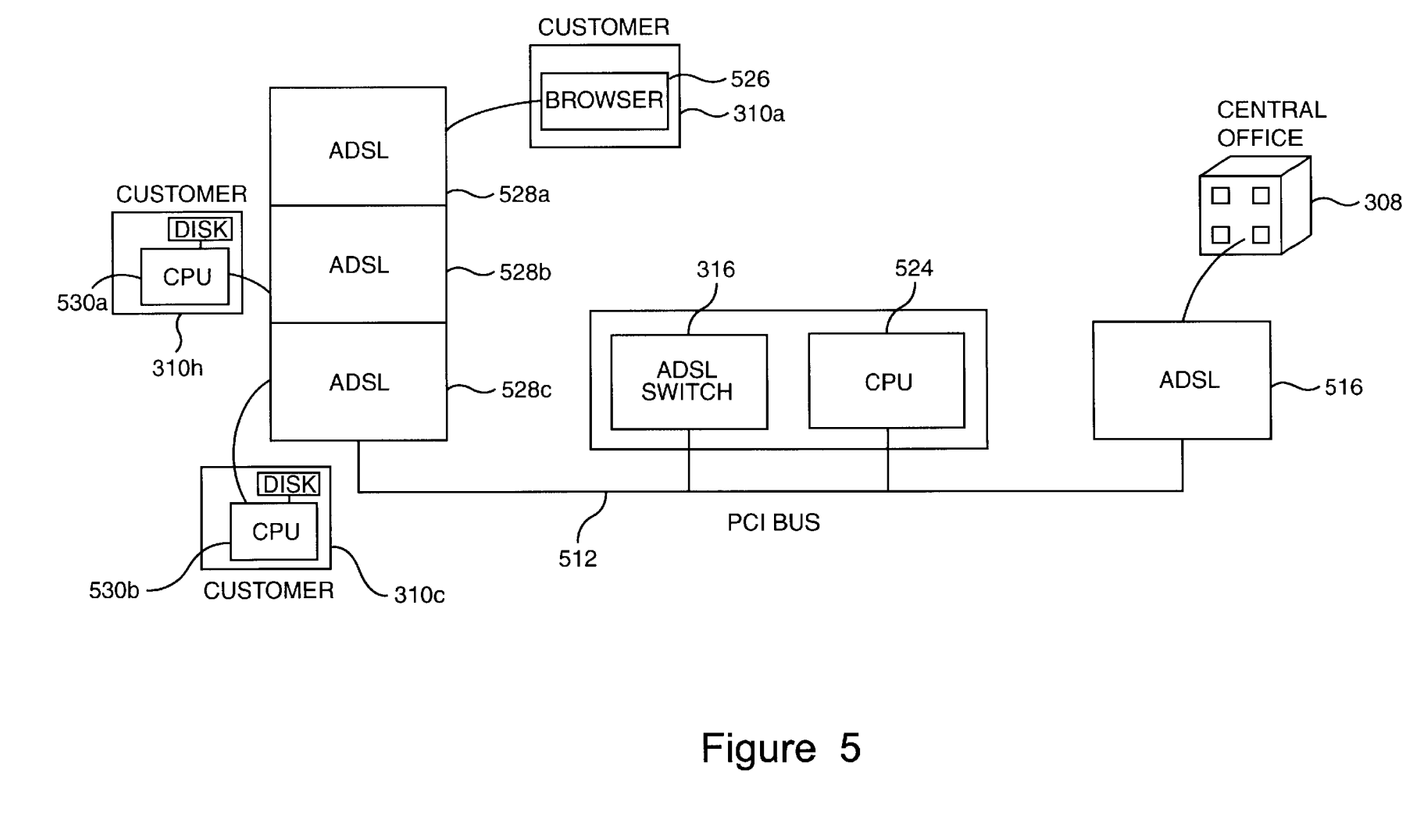
FIG. 5 is a diagrammatic block diagram representation of switched ADSL connections to a central office in accordance with the first embodiment of the present invention.

Referring next to FIG. 5, the routing of data between central office 308 and customers 310a–l, as shown in FIG. 3, will be described in accordance with the first embodiment of the present invention. In other words, the routing of data from a wide area network (WAN), which includes central office 308, across ADSL connections will be described. Data is transferred between central office 308 and customers 310a–c over a bus, as for example a Peripheral Component Interconnect (PCI) protocol bus 512, which includes ADSL connections and distribution cables. The transfer of data between central office 308 and a customer, i.e., one of customers 310a–c, is bi-directional. That is, data may be transferred from central office 308 to a customer across PCI bus 512, and data may be transferred from a customer to central office 308 across PCI bus 512.

In general, the rate at which data may be transferred between central office 308 and customers 310a–c may vary depending upon factors including the number of customers associated with central office 308. As such, the data transfer, or exchange, rate may be widely varied. In one embodiment, the data transfer rate associated with downloading data from central office 308 to customers 310a–c may be up to approximately 8 Mbps, as for example in the range of approximately 6 Mbps to 8 Mbps, or in the range of approximately 128 Kbps to approximately 1.544 Mbps. In such an embodiment, the data transfer rate associated with uploading data from customers 310a–c to central office 308 may be up to approximately 384 Kbps, as for example in the range of approximately 32 Kbps to approximately 384 Kbps. It should be appreciated that although the data transfer rate associated with transferring data between ADSL switch 316 and central office 308 is generally substantially the same as the data transfer rate associated with transferring data between ADSL switch 316 and customers 310a–c, the data transfer rates may also be varied.

When a customer, as for example customer 310a, wishes to download data via central office 308, central office 308 may process, e.g., route, data using an ADSL card 516. From ADSL card 516, data is transferred through ADSL switch 316 and a CPU 524 which are coupled together. CPU 524 generally executes software which allows the components within ADSL switch 316 to essentially multiplex or demultiplex data, as appropriate.

As shown, customer 310a has a browser 526 on which data transferred from central office 308 may be viewed. In one embodiment, browser 526 may be arranged to display video data requested using video-on-demand applications. It should be appreciated that customers may generally be arranged to download data from central office 308 for a variety of different purposes. By way of example, customers 310b, 310c may include CPUs 530a, 530b, respectively, which are arranged to process data obtained from central office 308. It should be appreciated that CPUs 530a, 530b may be coupled to any suitable computer storage media, e.g., disks, such that data obtained from central office 308 may be stored.

ADSL switch 316, which includes ADSL cards and a switch card as mentioned above, together with CPU 524, serves to route data transferred from central office 504 through PCI bus 512 to the appropriate receiving customer, e.g., customer 310a. In other words, ADSL switch 316 essentially functions as a de-multiplexer. From ADSL switch 520 and CPU 524, data is transferred to an ADSL card 528a that is associated with, or otherwise linked with, receiving customer 310a. Once data is downloaded to customer 310a, the data may be displayed accordingly on browser 526.

Similarly, when data is to be uploaded from customer 310a to central office 308, the data is processed by ADSL card 528a, and routed over PCI bus 512, e.g., a distribution cable associated with PCI bus 512, to ADSL switch 316 and, hence, CPU 524. When data is uploaded from customer 310a, ADSL switch 316 basically multiplexes the data and routes the data to central office 308 when PCI bus 512 is available, i.e., available for routing the data to central office 308.

As previously mentioned, allowing an ADSL connection and a single port associated with a central office to be shared by a plurality of customers increases the use of the available bandwidth of a given ADSL connection. A shared ADSL connection also allows the overall data transfer rate of a given customer base to be increased over a given loop length. In order to further increase the transfer rate of data transferred over a given loop length, a "fat pipe" may be implemented within the loop. That is, Ethernet traffic may be carried via a fat pipe, which is generally multiple pairs of wire over which data may be transferred, as will be appreciated by those skilled in the art. In one embodiment, multiple wires may be used to allow data to be substantially simultaneously transferred over the wires. The implementation of a fat pipe, therefore, increases the rate at which data, such as Internet data, may be transferred between a central office and a customer.

Figure 6:
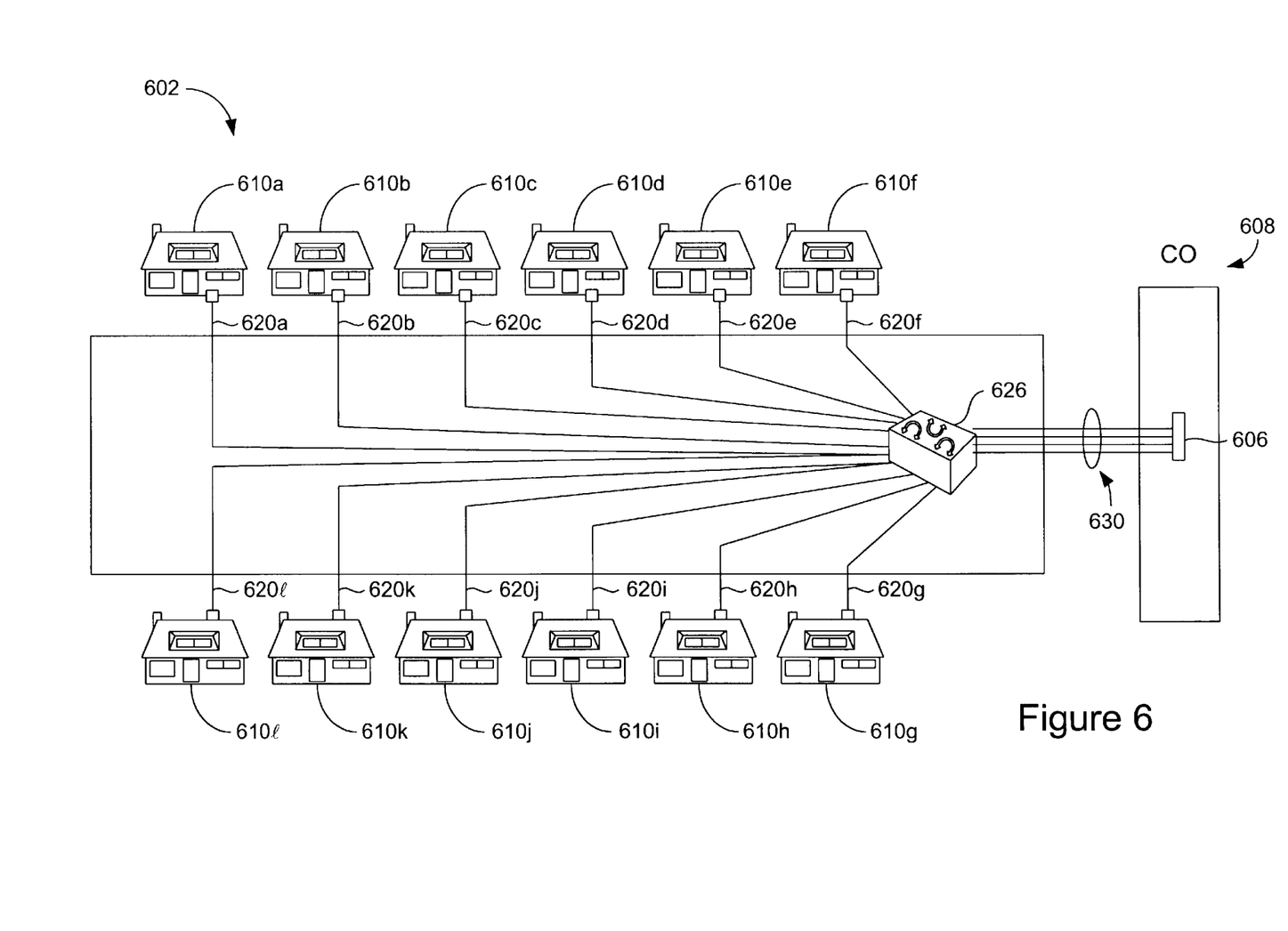
FIG. 6 is a diagrammatic representation of switched Ethernet connections to a central office in accordance with a second embodiment of the present invention.

Although a fat pipe may generally be used as either a distribution cable or a feeder cable, in one embodiment, a fat pipe is used as a feeder cable. FIG. 6 is a diagrammatic representation of a customer base which is in communication with a central office through switched connections to a fat pipe in accordance with a second embodiment of the present invention. A customer base with switched ADSL connections 602 is linked to a single port 606 in a central office 608. In general, port 606 in central office 608 may serve multiple customers 610a–l. Distribution cables 620a–l link customers 610a–l, respectively, to an ADSL switch 626. A fat pipe assembly 630 serves as a feeder cable to link port 606 of central office 608 to ADSL switch 626. Hence, Ethernet traffic may essentially be carried between port 606 and customers 610a–l, using fat pipe assembly 630.

In general, fat pipe assembly 630 includes a plurality of pairs wires which enable data to be transferred over a plurality of wires at the same time. It should be appreciated that the amount of time associated with transferring a fixed amount of data may decrease as the number of wires increases. As data is essentially sent over fat pipe assembly 630 in series form, data must generally be reconstructed after it is sent over fat pipe assembly 630. In one embodiment, fat pipe assembly 630 may include mechanisms which allow data being transferred across the plurality of data lines in fat pipe assembly 630 to be synchronized such that after data is received at one end of fat pipe assembly 630, the data may be reconstructed into its original form.

Figure 7:
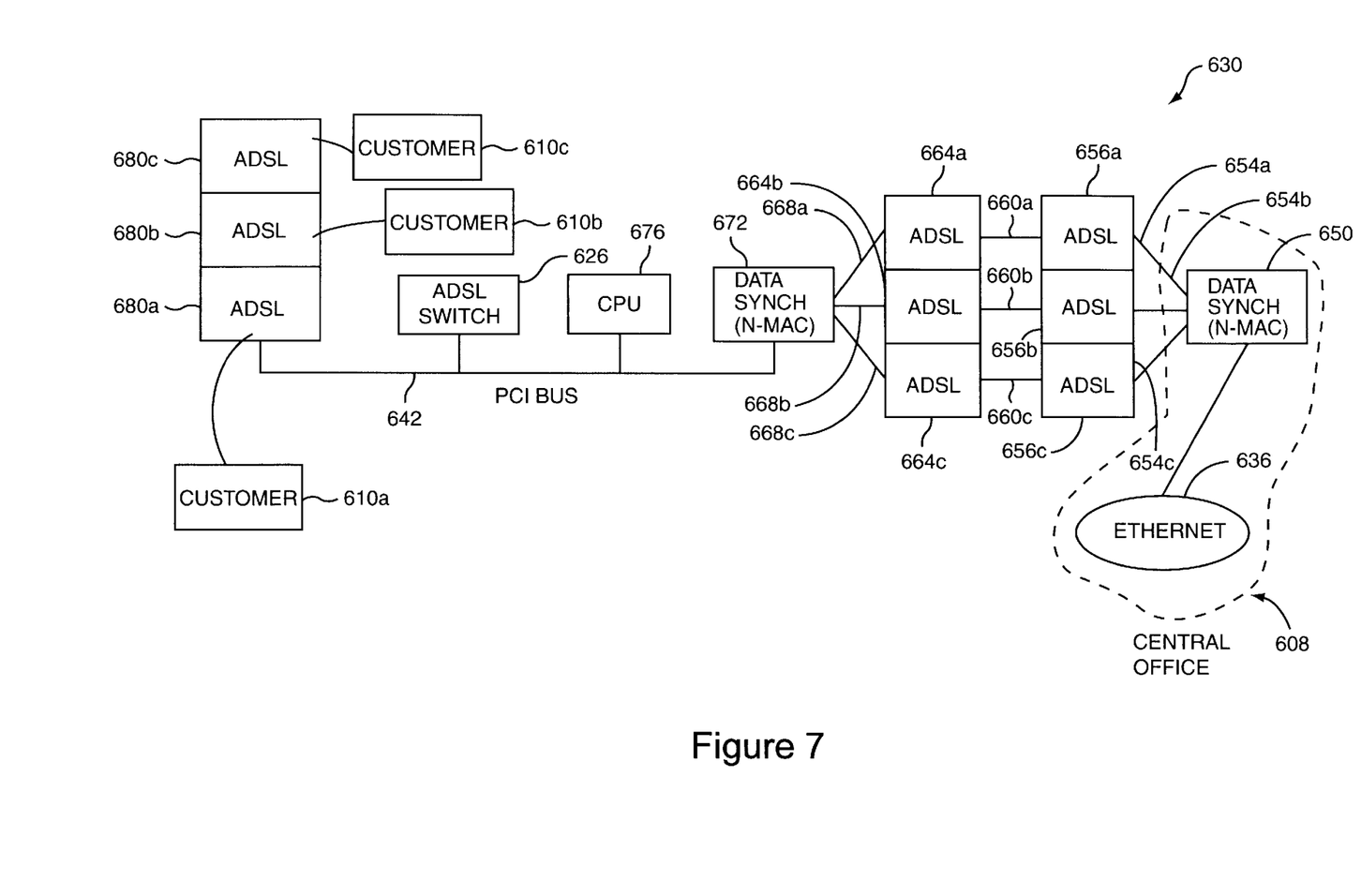
FIG. 7 is a diagrammatic block diagram representation of switched Ethernet connections to a central office in accordance with the second embodiment of the present invention.

The flow of traffic through fat pipe 620 and distribution cables 620a–l will be described in accordance with FIG. 7, which is a representation of switched Ethernet connections to central office 608 in accordance with the second embodiment of the present invention. That is, the routing of data from a wide area network (WAN), which includes central office 608, across Ethernet connections will be described. Data is transferred between an Ethernet port 636, central office 608, and customers 610a–c using a bus, as for example a PCI protocol bus 642 which include distribution cables. Data that is being transferred may take on many suitable forms. By way of example, the data may be embodied as a carrier wave for transfer over bus 642.

The transfer of data between central office 608 and a selected customer 310a–c is largely bi-directional. That is, data may be downloaded from central office 608 to a customer across bus 642, and data may be uploaded from a selected customer 610a–c to central office 608 across bus 642.

When a customer, as for example customer 610a, wishes to download data via central office 608, central office 608 may process, e.g., route, data using a data synchronizing mechanism 650, or a synchronizing N-media access (N-MAC) controller. In general, synchronizing mechanism 650 includes data buffers which are used to synchronize data over different wires 654a–c which are associated with fat pipe assembly 630. It should be appreciated that data may be synchronized for transport and "de-synchronized" for receipt. Synchronizing mechanism 650 may further be arranged to correct for crossed wires, e.g., wires 654a–c.

Data is transferred across wires 654a–c associated with fat pipe assembly 630. Wires 654a–c are each coupled to a selected ADSL card 656a–c, as shown. From ADSL cards 656a–c, data is transferred through wires 660a–c to ADSL cards 664a–c, respectively. From ADSL cards 664a–c, data is transferred across wires 668a–c to a data synchronizing mechanism 672. Like data synchronizing mechanism 650, data synchronizing mechanism 672 generally includes data buffers, and is arranged to synchronize and desynchronize data as necessary. Data synchronizing mechanism 672 is coupled to bus 642, and serves to transfer data to bus 642.

ADSL switch 626 and a CPU 676 are coupled together on bus 642. In one embodiment, CPU 676 generally executes software which allows the components within ADSL switch 626 to essentially multiplex or demultiplex data, as appropriate. Components in ADSL switch 626 generally include ADSL cards and a switch card. ADSL switch 626, together with CPU 676, routes data transferred from central office 608, through fat pipe assembly 630 and bus 512 to the appropriate receiving customer, e.g., customer 610a. From ADSL switch 626 and CPU 676, data is transferred to an ADSL card 680a that is associated with receiving customer 610a. In general, data may be transferred to the appropriate ADSL card 680a–c for a selected receiving customer 610a–c, as will be appreciated by those skilled in the art.

When data is to be uploaded from customer 610a to central office 608, the data is processed by ADSL card 680a, and routed over bus 642, e.g., a distribution cable associated with bus 642, to ADSL switch 626 and, hence, CPU 676. From ADSL switch 626 and CPU 676, data is transferred to synchronizing mechanism 672, which processes the data and sends the data over lines 668a–c to ADSL cards 664a–c. From ADSL cards 664a–c, data is transferred over wires 660a–c to ADSL cards 656a–c. Final, the data is sent over wires 654a–c to synchronizing mechanism 650 and Ethernet port 636, which is associated with central office 608.

Although only a few embodiments of the present invention have been described, it should be understood that the present invention may be embodied in many other specific forms without departing from the spirit or the scope of the present invention. By way of example, while the ADSLs of the present invention have been discussed in terms of being implemented with wires such as copper wires, the ADSLs may also generally be implemented using any suitable material. Suitable materials may include, but are not limited to, various fibers without departing from the spirit or the scope of the present invention.

The use of ADSL switches has been described in association with using a single ADSL switch, or an "initial" ADSL switch, to enable a single port in a central office to be used by a shared ADSL connection. However, "secondary" ADSL switches, which enable multiple customers to be linked to a previously "individual" distribution cable, may be implemented in addition to the initial ADSL switch without departing from the spirit or the scope of the present invention. That is, secondary switches may be implemented to allow distribution cables between a customer site and an initial ADSL switch to be shared. In such an implementation, a secondary ADSL switch may be shared by multiple customers and, in turn, multiple secondary ADSL switches may be linked to an initial ADSL switch. Implementing secondary switches may generally be effective in increasing the customer base which may be supported by a given central office. However, in some embodiments, the use of secondary switches may compromise the performance and quality of data transfer between a central office and a customer. Therefore, the present examples are to be considered as illustrative and not restrictive, and the invention is not to be limited to the details given herein, but may be modified within the scope of the appended claims.

What is claimed is:

1. A method for communicating between a computer in a central office and a remote computer across a set of digital subscriber loop DSL communications links the method comprising:

sending a first set of data from the central office computer across a first DSL communications link included in the set of DSL communications links, wherein the first DSL communications link couples the central office computer to a switch;

selecting a second DSL communications link from a plurality of DSL communications links included in the set of digital subscriber loop communications links, wherein the second DSL communications link couples the switch and the remote computer;

sending the first set of data from the switch to the remote computer across the second DSL communications link;

determining the availability of the second DSL communications link prior to sending the first set of data across the second DSL communications link; and delaying sending the first set of data from the switch to the remote computer across the second DSL communications link when it is decided that the second DSL communications link is not available.

2. A method for communicating between a computer in a central office and a remote computer across a set of digital subscriber loop DSL communications links the method comprising:

sending a first set of data from the central office computer across a first DSL communications link included in the set of DSL communications links wherein the first DSL communications link couples the central office computer to a switch;

selecting a second DSL communications link from a plurality of DSL communications links included in the set of digital subscriber loop communications links wherein the second DSL communications link couples the switch and the remote computer;

determining the availability of the first DSL communications link prior to sending a second set of data across the second DSL communications link;

sending the first set of data from the switch to the remote computer across the second DSL communications link when it is determined that the first DSL communications link is available;

sending the second set of data from the remote computer across the second DSL communications link to the switch when it is determined that the first DSL communications link is available;

sending the second set of data from the switch to the central office computer across the first DSL communications link when it is determined that the first DSL communications link is available; and delaying sending the first set of data from the switch mechanism to the remote computer across the second DSL communications link when it is decided that the first DSL communications link is not available.

3. A method for communicating between a computer in a central office and a remote computer across a set of digital subscriber loop DSL communications links the method comprising:

sending a first set of data from the central office computer across a first DSL communications link included in the set of DSL communications links, wherein the first DSL communications link couples the central office computer to a switch;

selecting a second DSL communications link from a plurality of DSL communications links included in the set of digital subscriber loop communications links, wherein the second DSL communications link couples the switch and the remote computer; and sending the first set of data from the switch to the remote computer across the second DSL communications link, wherein the first DSL communications link is a first asymmetric digital subscriber loop ADSL communications link and the second DSL communications link is a second ADSL communications link.

4. An apparatus for enabling a remote computer to exchange data bi-directionally with a central office across digital subscriber loop DSL communications links, the DSL communications links including a first DSL communications link and a second DSL communications link, the apparatus comprising:

a central office port associated with the central office;

a switching assembly in communication with the central office port through the first DSL communications link that is arranged to allow the data to be exchanged between the central office port and the switching assembly; and a plurality of distribution links wherein a selected one of the distribution links couples the switching assembly with the remote computer to facilitate the exchange of data between the central office and the remote computer through the switching assembly, wherein the selected one of the distribution links is the second DSL communications link, and wherein the first DSL communications link and the distribution links are asymmetric digital subscriber loop ADSL links.

5. The computer program product for communicating across a set of digital subscriber loop DSL communications links comprising:

a first set of computer code that causes a first set of data to be sent from a central office across a first DSL communications link included in the set of DSL communications links wherein the first DSL communications link couples the central office to a switch;

a second set of computer code that selects a second DSL communications link from a plurality of DSL communications links included in the set of DSL communications links, wherein the second DSL communications link couples the switch and a remote device;

a third set of computer code that causes the first set of data to be sent from the switch to the remote device across the second DSL communications link;

a fourth set of computer code that determines the availability of the second DSL communications link prior to sending the first set of data across the second DSL communications link;

a fifth set of computer code that delays sending the first set of data from the switching mechanism to the remote device across the second DSL communications link when it is decided that the second DSL communications link is not available; and a computer readable medium that stores the sets of computer codes.

6. The computer program product for communicating across a set of digital subscriber loop DSL communications links comprising:

a first set of computer code that causes a first set of data to be sent from a central office across a first DSL communications link included in the set of DSL communications links, wherein the first DSL communications link couples the central office to a switch;

a second set of computer code that selects a second DSL communications link from a plurality of DSL communications links included in the set of DSL communications links, wherein the second DSL communications link couples the switch and a remote device;

a third set of computer code that causes the first set of data to be sent from the switch to the remote device across the second DSL communications link, wherein the first DSL communications link is a first asymmetric digital subscriber loop ADSL communications link, and the second DSL communications link is a second ADSL communications link; and a computer readable medium that stores the sets of computer codes.

* * * * *